United States Patent [19]

Durkee

[11] Patent Number: 4,657,706
[45] Date of Patent: Apr. 14, 1987

[54] METHOD OF IMPROVING THE COLOR OF TALL OIL ROSIN ESTERS

[75] Inventor: Susan C. Durkee, Wilmington, Del.

[73] Assignee: Hercules Incorporated, Wilmington, Del.

[21] Appl. No.: 872,581

[22] Filed: Jun. 10, 1986

[51] Int. Cl.[4] .......................... C09F 1/04; C09F 7/00; C08L 93/04
[52] U.S. Cl. .................................. 260/104; 260/97.5
[58] Field of Search ............................... 260/97.5, 104

[56] References Cited

U.S. PATENT DOCUMENTS

| 3,106,550 | 10/1963 | Bitting et al. | 260/97.5 |
| 3,112,209 | 11/1963 | Bradley | 260/97.5 |
| 3,780,012 | 12/1973 | Smith | 260/104 |
| 4,548,746 | 10/1985 | Duncan et al. | 260/97.5 |
| 4,585,584 | 4/1986 | Johnson et al. | 260/97.5 |

Primary Examiner—Herbert S. Cockeram
Attorney, Agent, or Firm—Joanne L. Horn

[57] ABSTRACT

Disclosed is a method of improving the color of tall oil rosin esters comprising the sequential steps of (a) heating the tall oil rosin in the presence of a carboxylic acid anhydride and a Lewis acid catalyst, (b) distilling the reaction mixture, and (c) esterifying the distilled tall oil rosin with a polyol. The improved tall oil rosin esters produced thereby are useful in the manufacture of a variety of products, such as paper and textile sizes, plasticizers for polyolefin films, paints, varnishes, hot melt adhesives and pressure sensitive adhesives.

12 Claims, No Drawings

METHOD OF IMPROVING THE COLOR OF TALL OIL ROSIN ESTERS

This invention relates to a method of improving the color of tall oil rosin esters and to the tall oil rosin esters produced therefrom.

Rosin is composed mainly of a mixture of diterpene acids, known as resin acids, with a smaller amount of other acidic and neutral bodies present. Rosin characteristically contains color bodies or coloring matter visible to the naked eye and certain color bodies which are not normally visible to the naked eye, usually referred to as latent color bodies. In crude wood rosin, the latent color bodies have a tendency to darken and discolor the wood rosin when such color bodies are exposed to the action of air and an alkali, as for example, when the wood rosin is saponified. For tall oil rosin, latent color bodies contained therein do not color the tall oil rosin until the rosin is treated with certain polyols, such as pentaerythritol, to form an ester, or heated in the presence of oxygen, such as in the manufacture of hot melt adhesives. Gum rosin does not appear to contain latent color bodies.

The visible coloring matter in a tall oil, wood or gum rosin determines its grade and hence its value. The darker the rosin, the lower its grade and value. The presence of invisible or latent color bodies, while not affecting the apparent grade, is highly disadvantageous in the case of tall oil rosin since they render the polyol esters produced therefrom undesirable for use in the production of products where palest color of the product and retention of color are desired.

Typically, for example, the color of the tall oil rosin goes from an initial color of WW to a color of H (six color grades) during esterification with pentaerythritol and degrades by one color grade with glycerine. On the other hand, wood rosin actually improves during esterification with pentaerythritol, and gum rosin does not degrade in color upon esterification with polyols.

The tall oil rosin may be flash distilled prior to esterification which improves its color from WW to XA. However, a loss of six color grades (XA to K) still occurs upon esterification with pentaerythritol.

The rosin color standards used herein are the United States Department of Agriculture (USDA) rosin standards which vary from XC (lightest) through XB, XA, X, WW, WG, N, M, K, I, H, G, F, E and D (darkest).

According to the present invention, there is provided a method of improving the color of tall oil rosin esters comprising the sequential steps of (a) heating the tall oil rosin in the presence of a carboxylic acid anhydride and a Lewis acid catalyst, (b) distilling the resultant reaction mixture, and (c) esterifying the distilled tall oil rosin with a polyol. The tall oil rosin from steps (a) and (b) above forms a pentaerythritol ester which is 4 to 5 color grades lighter and a glycerine ester which is 1 to 2 color grades lighter than the same ester produced from a tall oil rosin which has not been treated according to steps (a) and (b) above.

The carboxylic acid anhydride and the Lewis acid catalyst may be added with the tall oil rosin or after the tall oil rosin is melted.

The use of a carboxylic acid anhydride alone without the Lewis acid catalyst is not effective in improving the color stability of the rosin.

Esters prepared from a tall oil rosin which is heated in the presence of a carboxylic acid anhydride and a Lewis acid catalyst without the benefit of distillation do not show any color improvement over the esters prepared from the untreated tall oil rosin.

The treatment of rosin with maleic anhydride or other alpha-, beta-unsaturated polycarboxylic acids or anhydrides by heating the rosin with such unsaturated acids and anhydrides to form a Diels-Alder adduct is known (see, e.g. U.S. Pat. Nos. 2,322,197, 2,334,194, 2,536,658 and 2,569,495). The resultant rosin adduct has improved heat stability over the untreated rosin since it is formed at the expense of the diene functionality in rosin, which is readily oxidizable if left unreacted. This high melting rosin adduct may them be used to prepare a hard, polar ester with pentaerythritol which is useful in inks and varnishes.

The present invention improves the color stability of the tall oil rosin during pentaerythritol esterification by virtue of the fact that it removes color formers from the rosin, and not by forming a Diels-Alder adduct with the resin acids in tall oil rosin by reaction with an unsaturated polycarboxylic acid or anhydride. This is demonstrated by the fact that phthalic anhydride, which does not form a Diels-Alder adduct with the resin acids in tall oil rosin, is useful in the practice of this invention.

Tall oil rosin is isolated from crude tall oil. Crude tall oil is obtained by acidulation of the "black liquor soap" skimmed off the concentrated alkaline digestion liquor washed out of paper pulp in the sulfate or kraft process for the manufacture of paper. The crude tall oil is then subjected to a series of fractional distillations to separate the rosin from the fatty acids and pitch to provide a tall oil rosin having a mixture of rosin and fatty acids. Depending on the cut, the tall oil rosin may have a resin acid content from about 1% to about 99% by weight. For purposes of this invention, tall oil rosin means tall oil rosin having a resin acid content of from about 80% to about 99%, preferably from about 86% to about 94%.

Suitable carboxylic acid anhydrides include maleic anhydride, phthalic anhydride, and other carboxylic acid anhydrides in which there is a 5-membered cyclic anhydride present, such as 5-membered cyclic anhydrides having the formulae:

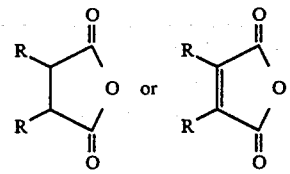

wherein R is H, $C_{1-10}$ normal or branched alkyl, $C_{3-6}$ cycloalkyl, aryl, alkaryl, and may be the same or different. Suitable alkyl radicals include methyl, ethyl, propyl, isopropyl and butyl. Typical cycloalkyl radicals include cyclopentyl and cyclohexyl. Suitable aryl radicals include benzyl and naphthyl. Tolyl is a typical alkaryl radical. The alkyl, cycloalkyl, aryl and alkaryl radicals may be substituted or unsubstituted.

The carboxylic acid anhydride is present in an amount from about 0.05 to about 2.5%, by weight, preferably from about 0.08 to about 1.5%, and most preferably from about 0.10 to about 1.2%.

Typical Lewis acid catalysts include aluminum chloride, zinc chloride, stannic chloride, boric acid, boric trichloride, and boron trifluoride. The Lewis acid catalyst is present in an amount from about 0.05 to about 1%, by weight, preferably from about 0.1 to about 0.4%.

The tall oil rosin, carboxylic acid anhydride, and Lewis acid catalyst are generally heated at about 150° C. to about 300° C. for about 5 to about 120 minutes, preferably from about 170° C. to about 200° C. for about 15 to about 35 minutes.

The tall oil rosin is heated in the presence of a carboxylic acid anhydride and a Lewis acid catalyst to reduce the volatility of latent color formers, plus some visible color bodies.

The treated tall oil rosin is then distilled to remove these color bodies, which remain in the distillation vessel. The tall oil rosin distillate has a USDA color of XB to XA.

Conditions typical for the distillation of tall oil rosin are about 150° C. to about 300° C. at pressures of about 0.05 to about 50 mm Hg. Up to 96% of the original charge may be distilled. Oxygen should be excluded as much as possible to avoid oxidation of the rosin.

All parts and percentages used in this specification are by weight unless otherwise indicated.

This invention is more particularly described and illustrated by the following specific examples.

EXAMPLE 1

This example illustrates the preparation of a tall oil rosin having improved color by the method of this invention.

A reaction vessel fitted with a magnetic stir bar, a thermometer and a receiver is charged with 600 parts of tall oil rosin having a USDA color of WG and a resin acid content of 91% and heated to about 180° C. with agitation until the tall oil rosin is melted (about 30 minutes). Twelve (12) parts of maleic anhydride and 1.8 parts of zinc chloride are added to the vessel and the vessel is flushed with nitrogen. The contents of the vessel are then heated at about 180° C. for about 30 minutes with agitation. The vessel is then evacuated via a mechanical pump which is attached to the receiver, and the temperature is gradually raised under 1 mm Hg pressure to a temperature of about 210° C. until the rosin begins to distill. Distillation is complete in about 45 minutes. Fifteen (15) parts of a forecut of the resultant tall oil rosin contains any unreacted carboxylic anhydride which is collected and discarded. Five hundred twenty (520) parts of a heartcut of the resultant tall oil rosin distillate product is recovered and has a USDA color of XB.

EXAMPLE 2

This example illustrates the preparation of the pentaerythritol ester of the improved tall oil rosin of this invention.

A reaction vessel, fitted with a distillation head and receiver for the collection of water and a thermometer to monitor the tall oil rosin temperature, is charged with 100 parts of the improved tall oil rosin having a USDA color of XB of Example 1, 12.7 parts pentaerythritol and 0.2 parts calcium formate catalyst. The mixture is heated under inert atmosphere to 285° C. and is stirred until the acid number (acid number is equal to the milligrams of normalized potassium hydroxide in a methanol solution required to titrate 1 g of rosin) drops to a value of 10 to 16 (about 8 hours). One hundred seven (107) parts of the pentaerythritol ester of the tall oil rosin is recovered having a USDA color of X.

EXAMPLE 3

This example illustrates another preparation of a tall oil rosin having improved color by the method of this invention.

The formulation and procedures of Example 1 are used except that 1 part maleic anhydride is used instead of 12 parts and except that 1 part of zinc chloride is used instead of 1.8 parts. Five hundred twenty-five (525) parts of a heartcut of the resultant tall oil rosin product has a USDA color of XB.

EXAMPLE 4

This example illustrates another preparation of the pentaerythritol ester of the improved tall oil rosin of this invention.

The procedures and formulation of Example 2 are used except that 100 parts of the improved tall oil rosin having a USDA color of XB of Example 3 is used instead of 100 parts of the improved tall oil rosin having a USDA color of XB of Example 1. The resultant ester has a USDA color of WG.

EXAMPLE 5

This example illustrates the preparation of the glycerol ester of the improved tall oil rosin of this invention.

The procedure and ingredients of Example 2 is used except that 18.5 parts glycerol is used instead of 12.7 parts pentaerythritol, and except that the mixture is heated to 240° C. for 30 minutes, and then the temperature is raised to 275° C. until the acid number drops to 3 to 9 (about 10 hours). One hundred ten (110) parts of the glycerol ester of tall oil rosin is recovered having a USDA color of XA.

EXAMPLE 6

This example illustrates another preparation of a tall oil rosin having improved color by the method of this invention.

The formulation and procedures of Example 1 are used except that 6 parts phthalic anhydride is used instead of 12 parts maleic anhydride. Five hundred twenty-five (525) parts of a heartcut of the resultant tall oil rosin product has a USDA color of XA.

EXAMPLE 7

This example illustrates another preparation of the pentaerythritol ester of the improved tall oil rosin of this invention.

The procedures and formulation of Example 2 are used except that 100 parts of the improved tall oil rosin having a USDA color of XA of Example 6 is used instead of 100 parts of the improved tall oil rosin having a USDA color of XB of Example 1. The resultant ester has a USDA color of WW.

COMPARATIVE EXAMPLE 8

This comparative example illustrates the formation of a pentaerythritol ester from tall oil rosin which has not been heated in the presence of a carboxylic acid anhydride and a Lewis acid catalyst and then distilled according to this invention.

A reaction vessel, fitted with a distillation head and receiver for the collection of water and a thermometer to monitor the tall oil rosin temperature, is charged with 100 parts of tall oil rosin having a USDA color of WW, 12.7 parts pentaerythritol and 0.2 parts calcium formate catalyst. The resulting mixture is heated under inert atmosphere to about 285° C. and is stirred until the acid number (acid number is equal to the milligrams of potassium hydroxide required to titrate 1 g of rosin) drops to a value of 10 to 16 (about 8 hours). One hundred seven (107) parts of the pentaerythritol ester of the tall oil rosin is recovered having a USDA color of H.

COMPARATIVE EXAMPLE 9

This comparative example illustrates the distillation of tall oil rosin which has not been heated in the presence of a carboxylic acid anhydride and a Lewis acid catalyst according to this invention.

A vessel fitted with a magnetic stir bar, a thermometer and a receiver is charged with 600 parts of tall oil rosin having a USDA color of WG and a resin acid content of 91%, which has not been heated in the presence of a carboxylic acid anhydride and a Lewis acid catalyst. The vessel is flushed with nitrogen and the rosin heated to 200° C. The vessel is then evacuated via a mechanical pump which is attached to the receiver, and the temperature is gradually raised under 1 mm Hg pressure to a temperature of about 210° C., and the tall oil rosin begins to distill. Distillation is complete in about 45 minutes. Five hundred fifty-two (552) parts of tall oil rosin product is recovered and has a USDA color of XA.

COMPARATIVE EXAMPLE 10

This example illustrates the preparation of the pentaerythritol ester of the distilled tall oil rosin of Comparative Example 9.

The procedures and ingredients of Example 2 are used except that 100 parts of the distilled tall oil rosin having a USDA color of XA of Comparative Example 9 are used instead of 100 parts of the improved tall oil rosin having a USDA color of XB of Example 1. One hundred seven (107) parts of the pentaerythritol ester of the tall oil rosin is recovered having a USDA color of K.

COMPARATIVE EXAMPLE 11

This comparative example illustrates the treatment of tall oil rosin with a Lewis acid catalyst only.

The procedure and formulation of Example 1 is used except that the maleic anhydride is not added. Five hundred twenty (520) parts of a tall oil rosin having a USDA color of XB is recovered.

COMPARATIVE EXAMPLE 12

This example illustrates the preparation of the pentaerythritol ester of the tall oil rosin of Comparative Example 11.

The procedures and ingredients of Example 2 are used except that 100 parts of the tall oil rosin having a USDA color of XB of Comparative Example 11 are used instead of 100 parts of the improved tall oil rosin having a USDA color of XB of Example 1. One hundred seven (107) parts of the pentaerythritol ester of the tall oil rosin is recovered having a USDA color of N.

COMPARATIVE EXAMPLE 13

This comparative example illustrates the treatment of tall oil rosin with a carboxylic acid anhydride only.

The procedure and formulation of Example 1 is used except that 3 parts of maleic anhydride is used instead of 12 parts and zinc chloride is not added. Five hundred thirty (530) parts of a tall oil rosin having a USDA color of XA is recovered.

COMPARATIVE EXAMPLE 14

This example illustrates the preparation of the pentaerythritol ester of the tall oil rosin of Comparative Example 13.

The procedures and ingredients of Example 2 are used except that 100 parts of the tall oil rosin having a USDA color of XA of Comparative Example 13 are used instead of 100 parts of the improved tall oil rosin having a USDA color of XB of Example 1. One hundred seven (107) parts of the pentaerythritol ester of the tall oil rosin is recovered having a USDA color of K.

Thus, this invention provides a method for improving the color of tall oil rosin esters. The tall oil rosin esters thus produced are useful in a variety of applications, such as paper and textile sizes, plasticizers for polyolefin films, paints, varnishes, hot melt adhesives and pressure sensitive adhesives.

Features, advantages and other specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A method of improving the color of tall oil rosin esters comprising the sequential steps of:
   (a) heating the tall oil rosin in the presence of a carboxylic acid anhydride and a Lewis acid catalyst;
   (b) distilling the resultant reaction mixture; and
   (c) esterifying the distilled tall oil rosin with a polyol.

2. The method of claim 1 wherein the carboxylic acid anhydride is selected from the group consisting of maleic anhydride, phthalic anhydride, and 5-membered cyclic anhydrides having the formulae:

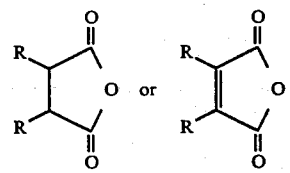

wherein R is H, $C_{1-10}$ normal or branched alkyl, $C_{3-6}$ cycloalkyl, aryl and alkaryl.

3. The method of claim 1 wherein the Lewis acid catalyst is selected from the group consisting of aluminum chloride, zinc chloride, stannic chloride, boric acid, boron trichloride, and boron trifluoride.

4. The method of claim 1 wherein the distillation is carried out at a temperature of about 150 to about 300° C.

5. The method of claim 1 wherein the carboxylic acid anhydride is present in an amount from about 0.05 to about 2.5%, by weight.

6. The method of claim 1 wherein the Lewis acid catalyst is present in an amount from about 0.05 to about 1% by weight.

7. A product produced by the method of claim 1.
8. A product produced by the method of claim 2.
9. A product produced by the method of claim 3.
10. A product produced by the method of claim 4.
11. A product produced by the method of claim 5.
12. A product produced by the method of claim 6.

* * * * *